ıited States Patent

[11] 3,618,841

| | |
|---|---|
| Inventor | **Robert Daniel Browning** **Indianapolis, Ind.** |
| Appl. No. | **862,682** |
| Filed | **Oct. 1, 1969** |
| Patented | **Nov. 9, 1971** |
| Assignee | **RCA Corporation** |

ENDLESS LOOP TAPE CARTRIDGE

9 Claims, 4 Drawing Figs.

U.S. Cl. .......... 226/195, 242/55.19, 226/118

Int. Cl. .......... B65h 23/10

Field of Search .......... 226/195, 118; 242/55.19, 55.21, 55.16; 274/4 B, 11 B

References Cited

UNITED STATES PATENTS

| | | | |
|---|---|---|---|
| ',432 | 10/1967 | Bolick, Jr. | 226/118 X |
| ,275 | 12/1967 | Wright | 226/195 |

*Primary Examiner*—Richard A. Schacher
*Assistant Examiner*—Gene A. Church
*Attorney*—Eugene M. Whitacre

ABSTRACT: An endless loop tape cartridge for use with a cartridge tape player includes a cartridge housing having a tape storage chamber with two egress openings. The cartridge housing includes apertures adapted to accommodate the cartridge player transducers, and additionally, a rotatably mounted pressure roller. The endless loop of magnetic tape is positioned within the cartridge such that the tape loop path moves: (a) around the pressure roller, (b) into the cartridge storage chamber, (c) out through the cartridge chamber first egress opening, (d) across the front end of the cartridge for engagement with the player transducers, (e) around the pressure roller, (f) reinserted into the cartridge storage chamber, and (g) out through the cartridge chamber second egress opening back to the pressure roller.

INVENTOR
ROBERT DANIEL BROWNING

BY David E. Fitchenik
ATTORNEY

INVENTOR
ROBERT DANIEL BROWNING
BY David E. Pitchenik
ATTORNEY

ENDLESS LOOP TAPE CARTRIDGE

The present invention relates to tape cartridges, and more particularly, to tape cartridges adapted for use with an endless loop of magnetic tape.

Many tape cartridges include an endless loop of magnetic tape spirally wound around a rotatably mounted hub of a reel or turntable. During operation of the cartridge, the hub and roll of tape are rotated as the innermost convolution of tape is drawn out from around the hub and passed across the forward portion of the cartridge for cooperative engagement with an external transducing means. In these cartridges, to facilitate slippage of the tape within the tape roll, a costly lubricated tape is employed.

It is desirable to eliminate the rotating tape reel to reduce the number of moving parts in the cartridge and to permit the utilization of nonlubricated magnetic tape. Prior efforts along these lines have resulted in tape jamming due to a bunching up of the tape, usually at the points of ingress and egress from the cartridge tape storage chamber.

A cartridge embodying the present invention includes a cartridge housing having a tape storage chamber. A pressure roller is mounted within the cartridge housing to cooperate with an endless loop of magnetic tape. The loop of tape is positioned within the cartridge housing such that a first and a second section of the tape simultaneously pass around a portion of the pressure roller.

A complete understanding of the present invention may be obtained from the following detailed description thereof, when taken in conjunction with the accompanying drawing, in which.

Figure 1:
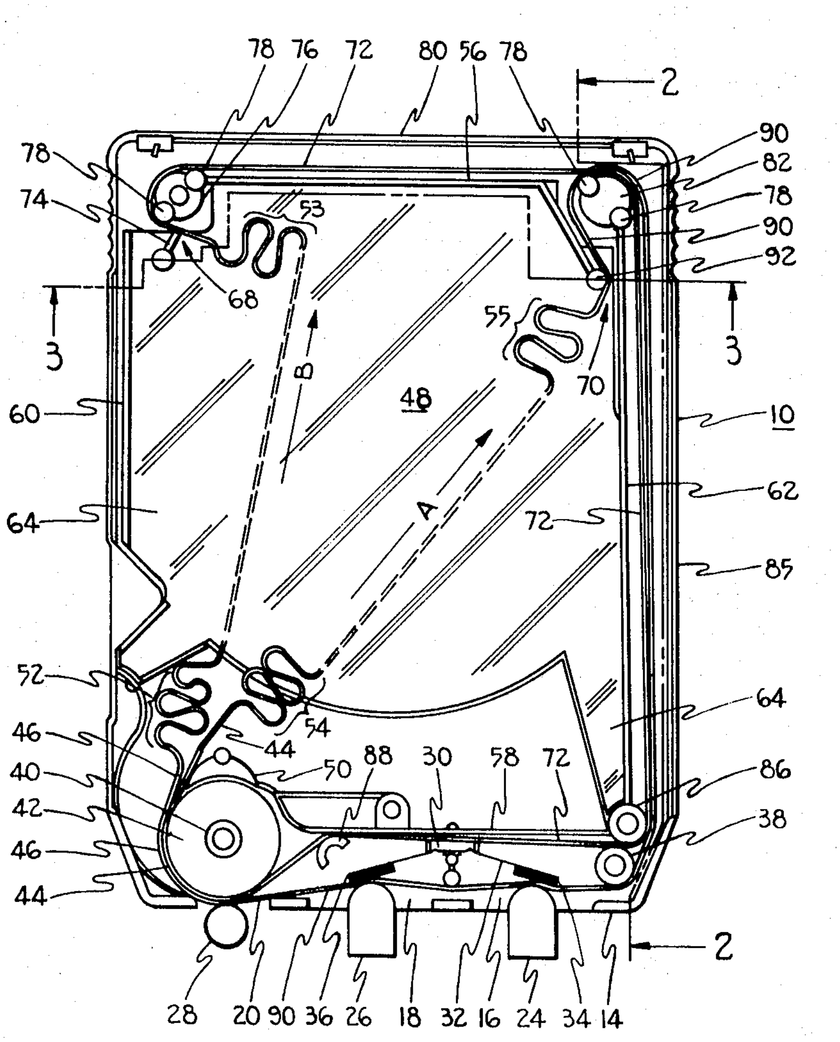
FIG. 1 is a plane view of an endless loop tape cartridge having the cover portion removed and embodying the present invention.

Referring now to the drawings wherein like reference numerals designate similar parts in the various figures, and endless loop tape cartridge includes a rectangularly shaped case 10. The front or forward end 14 of the cartridge has three rectangular apertures 16, 18, and 20 extending from right to left as viewed in FIG. 1. When the cartridge is inserted into a record-playback apparatus, not shown, apertures 16, 18, and 20 allow a portion of the magnetic tape to be exposed to operative contact with an erase or track sensing head 24, record- playback head 26, and drive capstan 28, respectively.

Upstanding from the bottom portion of the casing and spaced in from the front wall 14 is a pillar 30 supporting a spring member 32 having a pair of felt padded arms 34 and 36 in alignment with the apertures 16 and 18, respectively. Spaced to the right of the pillar is a tape guidepost 38, and to the left of the pillar, spaced behind the aperture 20, is an upright post 40 on which a cartridge pressure roller 42 is rotatably mounted.

When the cartridge is inserted into a tape player, the padded arms 34 and 36 effect a resilient engagement of the exposed tape portion with the apparatus erase or sensing head 24 and the record-playback head 26, respectively, while the pressure roller 42 pinches two sections of magnetic tape 44 and 46 against the player capstan 28 such that the sections are frictionally driven. The operation and importance of the two sections of magnetic tape will be described in greater detail hereinafter.

The two sections of magnetic tape 44 and 46 pass around a portion of the pressure roller 42 and are thereafter inserted into the tape storage chamber 48. The strands are separated from the pressure roller 42 by a stripper member 50 positioned within the cartridge adjacent the pressure roller. As the tape 44 and 46 enter chamber 48, the tape sections become stored in random serpentine folds as is shown by the sections of tape 52, 53, 54, and 55. For the purpose of clarity, only a small portion of the magnetic tape is shown within the chamber 48 with a few serpentine folds. The storage area comprises the inner portion of the cartridge bounded by the rear tape retaining wall 56, the forward tape retaining wall 58, and the two side retaining walls 60 and 62. Within the confines of this area, large sections of magnetic tape can be stored in relatively small random serpentine folds.

Figure 2:
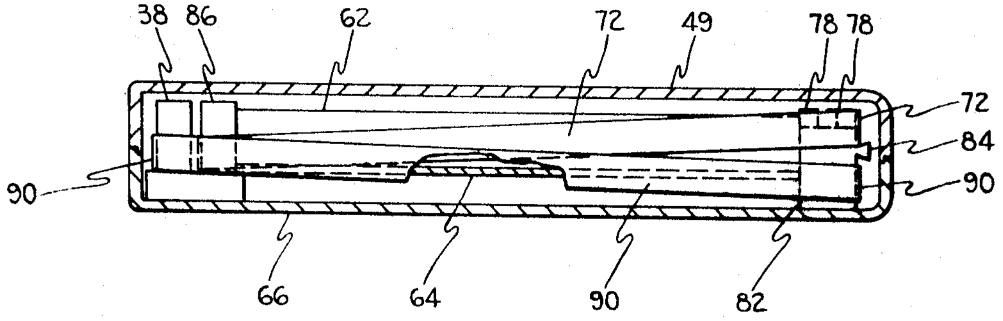
FIG. 2 is a section view of FIG. 1, partially broken away, taken along the lines 2—2 and including the cartridge cover.
Figure 3:
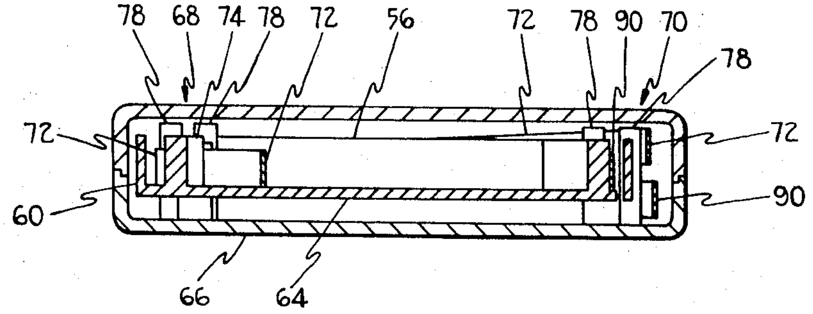
FIG. 3 is a section view of FIG. 1 taken along the lines 3—3 and including the cartridge cover.
Figure 4:
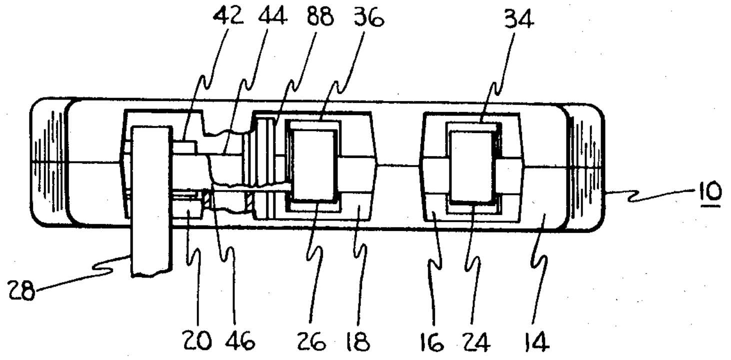
FIG. 4 is a front view, partially broken away, of the tape cartridge shown in FIG. 1.

The height between the bottom of the tape storage area 48 and the top of the cartridge cover portion 49, shown only in FIG. 2, should be less than twice the width of the sections of magnetic tape to prevent the tape sections from passing on top of each other. The prior art type cartridges which included the tape spirally wound around a hub of a reel or turntable can be modified to accommodate a tape arrangement as herein described. This is achieved by removing the hub and turntable and providing a platform 64 such that the tape storage chamber height is less than twice the width of the magnetic tape. The platform 64 may be supported by support members positioned between the platform and the bottom wall 66 of the cartridge case 10.

The storage chamber 48 includes two egress areas 68 and 70. The withdrawn section of the magnetic tape 72 egresses from area 68. Specifically, the magnetic tape passes between a tape stripper 74 and a tape guidepost 76. The tape guidepost 76, similar to tape guide post 82, may include studs 78 which in the prior art type tape cartridges would support a tape retaining member. The withdrawn tape 72 passes along the rear end of the cartridge between the storage area retaining wall 56 and the rear wall of the cartridge 80. The magnetic tape section 72 thereafter passes around magnetic tape guide post 82. The guide post 82 includes a projecting ear member 84 (FIG. 2) which supports the magnetic tape 72 as it passes around the guide- post. The tape 72 subsequently passes along the length of the cartridge between the tape storage area retaining wall 62 and the cartridge wall 85.

The magnetic tape 72 passes between the magnetic tape guidepost 86 and 38. The tape, after it passes around tape guidepost 86, moves between the upright post 30 and the front tape storage wall 58, around tape guide 88 to the pressure roller 42. Tape guide 88, similar to the other tape guides, may be molded in the cartridge. The tape 72 is thereafter pinched between the pressure roller 42 and player capstan 28 and inserted into the tape storage chamber 48 as the tape section previously designated 44. It should be recognized, of course, that the tape within the cartridge is one continuous loop of tape and that the several reference numerals are utilized only to designate various sections of tape.

Referring now to the tape egress area 70, a withdrawn section of tape 90 passes around a tape guidepost 92 and tape guidepost 82 as it is withdrawn from the tape storage chamber 48. The withdrawn tape 90, as is most clearly shown in FIG. 2, passes beneath the withdrawn tape 72 as it moves around the tape guide post 82. Ear member 84 supports the tape 72 and maintains separation between the two tape sections. The magnetic tape section 90 passes along the side of the cartridge between the tape storage retaining wall 62 and the cartridge sidewall 85. The magnetic tape 90 then passes around the tape guidepost 38 to thereafter form the section of magnetic tape which cooperates with the external transducing means. The tape 90 is pinched between the pressure roller 42 and the player capstan 28 to be reinserted into the tape storage area 48 as the tape section previously designated 46.

In operation, the inside section of magnetic tape 44 moves the random serpentine folds of the magnetic tape pack within the storage chamber 48 continuously in a first general direction designated by the arrow A. The outside strand of magnetic tape 46 also moves the random serpentine folds of the magnetic tape pack continuously in the general direction of the arrow B. These two motions prevent the magnetic tape stored in the tape storage chamber 48 from bunching up with a resultant tape jam. The continuous motion in two directions tends to "stir" the magnetic tape stored within the chamber. It has been found that a cartridge pressure roller fabricated from a rubberlike material provides the best operation of the cartridge with regard to the insertion of the two sections of magnetic tape 44 and 46 into tape storage chamber 48.

The magnetic tape path of the endless loop of magnetic tape beginning with tape section 46 as it is inserted into the tape storage chamber 48 will now be described. The tape 46 enters the tape storage chamber 48 after passing around the pressure roller 42. The tape is then stored in the chamber to be subsequently withdrawn from egress area 68 as magnetic tape section 72. The tape passes across the rear end of the cartridge, around tape guidepost 82 as the top tape section and thereafter down the side of the cartridge. The section 72, as it passes down the right side of the cartridge, is the tape section closest to the retaining wall 62. The tape section 72 subsequently passes around the guidepost 86 and across the front portion of the cartridge, passing behind upright post 30 and around tape guide 88. The tape 72 passes around the pressure roller 42 as the inside tape section designated 44. The section 44, after it passes around pressure roller 42, is stripped off the pressure roller by the stripper 50 and inserted into the cartridge tape storage chamber 48. The tape is stored in the chamber to be eventually withdrawn from egress area 70 as magnetic tape section 90. The tape section 90 passes around tape guidepost 92 and moves around the tape guidepost 94, beneath the tape section 72. The tape 90 thereafter passes along the right side of the tape cartridge as the outer section of tape. That is, the section of tape closest to the cartridge sidewall 85. The tape 90 passes around the tape guidepost 38, across the front end of the cartridge for cooperative engagement with the tape player heads 24 and 26, and around the pressure roller 42 as the outer tape section which is inserted into the cartridge tape storage chamber 48 as the tape section 46.

What is claimed is:

1. A tape cartridge comprising:

a cartridge housing including a tape storage chamber, said tape storage chamber including a first and a second tape egress area;

a pressure roller mounted within said cartridge housing;

an endless loop of tape positioned within said cartridge housing such that a first and a second section of said tape simultaneously pass around a portion of said pressure roller; and said endless loop of tape positioned within the cartridge tape storage chamber such that the tape traverses a path in a first direction and is withdrawn from said first egress area and traverses a path in a second direction and is withdrawn from said second egress area.

2. A cartridge as defined in claim 1 wherein the endless loop of tape is a magnetic tape and is positioned within said cartridge such that the magnetic tape withdrawn from said first egress area passes beneath the magnetic tape withdrawn from said second egress area.

3. A tape cartridge as defined in claim 1 wherein portions of the endless loop of tape are stored in said cartridge tape storage chamber in random serpentine folds and the motion of said tape in said first and said second direction moves the stored tape to prevent a bunching up of the tape.

4. A tape cartridge of the type including an endless loop of magnetic tape which is passed across the forward portion of the cartridge for cooperative engagement with an external transducing means, comprising:

a cartridge housing including a tape storage chamber having a first and a second egress area;

a pressure roller rotatably mounted within said cartridge housing;

said endless loop of magnetic tape positioned within said cartridge housing such that a first and a second section of said tape simultaneously pass around a portion of said pressure roller, each section inserted into said storage chamber; and said first tape section, after insertion into said storage chamber, traverses a path in a first direction and is withdrawn through said first egress area, and said second tape section, after insertion into said tape storage chamber, traverses a path in a second direction and is withdrawn through said second egress area.

5. A cartridge as defined in claim 4 including means positioned with said cartridge for passing said first tape section beneath said second tape section after each section has been withdrawn from said chamber egress areas.

6. A tape cartridge comprising:

a cartridge housing including a tape storage chamber having a first egress area and a second egress area;

a pressure roller rotatably mounted within said cartridge housing;

apertures within said cartridge housing adapted to accommodate external transducing means; and an endless loop of magnetic tape positioned within said cartridge such that the tape loop path moves: (a) around the pressure roller, (b) into said cartridge storage chamber, (c) out through the cartridge chamber first egress opening, (d) across the front end of the cartridge for engagement with the external transducing means, (e) around the pressure roller, (f) reinserted into the cartridge tape storage chamber, (g) out through the cartridge chamber second egress opening, and (h) across the front end of the cartridge back to the pressure roller.

7. A tape cartridge as defined in claim 6 wherein portions of the endless loop of magnetic tape are stored in said tape storage chamber in random serpentine folds and the motion of said tape sections in said first and said second direction moves the stored tape to prevent a bunching up of the tape in said tape storage chamber.

8. A tape cartridge as defined in claim 7 wherein said first egress area and said second egress area are located near the rear portion of the cartridge.

9. A tape cartridge as defined in claim 7 wherein said first egress area and said second egress area are located near the rear portion of the cartridge and spaced apart, each being near a cartridge sidewall.

* * * * *

UNITED STATES PATENT OFFICE

CERTIFICATE OF CORRECTION

Patent No. 3,618,841 Dated November 9, 1971

Inventor(s) Robert Daniel Browning

It is certified that error appears in the above-identified patent and that said Letters Patent are hereby corrected as shown below:

On page 1, in the references cited, the patent numbers should read as follows -- 3,347,432 -- (Bolick, Jr.) and -- 3,356,275 -- (Wright).

Signed and sealed this 25th day of April 1972.

(SEAL)
Attest:

EDWARD M.FLETCHER,JR.
Attesting Officer

ROBERT GOTTSCHALK
Commissioner of Patents

ORM PO-1050 (10-69)

USCOMM-DC 60376-P69
☆ U.S. GOVERNMENT PRINTING OFFICE 1969 O—366-334